US007908349B2

(12) United States Patent
Donatelli et al.

(10) Patent No.: US 7,908,349 B2
(45) Date of Patent: *Mar. 15, 2011

(54) RESOURCE MANAGEMENT WITH RULE BASED CONSISTENCY CHECK

(75) Inventors: Alessandro Donatelli, Rome (IT); Claudio Marinelli, Aprilia Latina (IT); Arcangelo Di Balsamo, Acerra (IT); Salvatore D'Alo', Rome (IT)

(73) Assignee: International Business Machines Corporation, Armonk, NY (US)

( * ) Notice: Subject to any disclaimer, the term of this patent is extended or adjusted under 35 U.S.C. 154(b) by 746 days.

This patent is subject to a terminal disclaimer.

(21) Appl. No.: 11/860,930

(22) Filed: Sep. 25, 2007

(65) Prior Publication Data

US 2008/0040459 A1 Feb. 14, 2008

Related U.S. Application Data

(63) Continuation of application No. 10/639,865, filed on Aug. 13, 2003, now Pat. No. 7,340,513.

(30) Foreign Application Priority Data

Aug. 13, 2002 (EP) .................................... 02368087

(51) Int. Cl.
*G06F 15/177* (2006.01)
(52) U.S. Cl. .......... 709/221; 709/220; 709/223; 709/224
(58) Field of Classification Search .................. 709/220, 709/226, 221, 217, 223, 224, 229
See application file for complete search history.

(56) References Cited

U.S. PATENT DOCUMENTS

| 4,888,771 | A | 12/1989 | Benignus et al. |
|---|---|---|---|
| 5,555,416 | A | 9/1996 | Owens et al. |
| 5,742,829 | A | 4/1998 | Davis et al. |
| 5,752,042 | A | 5/1998 | Cole et al. |
| 5,805,897 | A | 9/1998 | Glowny |
| 5,838,907 | A | 11/1998 | Hansen |
| 5,845,078 | A | 12/1998 | Tezuka et al. |
| 5,845,090 | A | 12/1998 | Collins, III et al. |
| 5,859,969 | A | 1/1999 | Oki et al. |
| 5,889,953 | A | 3/1999 | Thebaut et al. |
| 6,023,586 | A | 2/2000 | Gaisford et al. |

(Continued)

OTHER PUBLICATIONS

Wooten, J.W., "An N-tier Rule Based XML Architecture for a Contract Management System", Internet Document, XP002312565, URL:http://www.shoulderscorp.com/success/ContractManagement4.pdf.

(Continued)

*Primary Examiner* — Barbara N Burgess
(74) *Attorney, Agent, or Firm* — Francis Lammes; Stephen J. Walder, Jr.; Jeffrey S. LaBaw

(57) ABSTRACT

A mechanism is provided for implementing an adaptive model. The mechanism allows an authority to define a desired target state of several kinds of resources, which are directly controlled by different subjects. The authority publishes a series of rules in a shared repository; each rule indicates the target state of a resource for a corresponding logic or physic category of the subjects. Each subject retrieves the rules corresponding to its logic category from the shared repository. The rules are then applied by the subject; as a result, the physic category of the subject is updated. The subject now retrieves and applies the rules corresponding to its physic category. In this way, different dependency schemes may be implemented without any explicit definition in the rules.

5 Claims, 11 Drawing Sheets

U.S. PATENT DOCUMENTS

| | | | |
|---|---|---|---|
| 6,039,688 | A | 3/2000 | Douglas et al. |
| 6,074,434 | A | 6/2000 | Cole et al. |
| 6,110,228 | A | 8/2000 | Albright et al. |
| 6,119,204 | A | 9/2000 | Chang et al. |
| 6,128,657 | A * | 10/2000 | Okanoya et al. ............. 709/224 |
| 6,158,010 | A | 12/2000 | Moriconi et al. |
| 6,167,445 | A | 12/2000 | Gai et al. |
| 6,405,250 | B1 | 6/2002 | Lin et al. |
| 6,505,244 | B1 | 1/2003 | Natarajan et al. |
| 6,615,218 | B2 | 9/2003 | Mandal et al. |
| 6,618,715 | B1 | 9/2003 | Johnson et al. |
| 6,850,989 | B1 | 2/2005 | Lavian et al. |
| 6,915,338 | B1 | 7/2005 | Hunt et al. |
| 6,931,446 | B1 | 8/2005 | Cox et al. |
| 6,950,865 | B1 | 9/2005 | Depaolantonio |
| 6,983,317 | B1 * | 1/2006 | Bishop et al. ................. 709/223 |
| 7,080,141 | B1 * | 7/2006 | Baekelmans et al. ......... 709/224 |
| 7,209,927 | B2 | 4/2007 | Donatelli et al. |
| 7,228,407 | B2 | 6/2007 | D'Alo et al. |
| 7,577,722 | B1 * | 8/2009 | Khandekar et al. ........... 709/220 |
| 2002/0095454 | A1 | 7/2002 | Reed et al. |
| 2002/0095524 | A1 | 7/2002 | Sanghvi et al. |
| 2003/0051026 | A1 * | 3/2003 | Carter et al. ................... 709/224 |
| 2003/0115179 | A1 | 6/2003 | Prabakaran et al. |
| 2003/0120762 | A1 * | 6/2003 | Yepishin et al. .............. 709/223 |
| 2004/0019895 | A1 | 1/2004 | Dubal |
| 2004/0103173 | A1 | 5/2004 | Donatelli et al. |
| 2004/0111497 | A1 | 6/2004 | Donatelli et al. |
| 2004/0243699 | A1 | 12/2004 | Koclanes et al. |

OTHER PUBLICATIONS

"Sucess Stories", Internet Document, XP002312566, URL:http://web.archive.org/web/20020202035939/http://www.shoulderscorp.com/success.

"Internet Archive Wayback Machine", Internet Document, XP002312567, URL:http://web.archive.org.web/*/http://www.shoulderscorp.com/success/.

Barker et al., "Expert Systems for Configuration at Digital: XCON and Beyond", Communications of the Association for Computing Machinery, vol. 32, No. 3, New York, Mar. 1, 1989, pp. 298-318.

"Sendmail (8) FreeBSD System manager's manual Sendmail (8)", FreeBSD Hypertext Man Pages, 'Online', Aug. 2, 1998, URL:http://www.freebsd.org/cgi/man.cgi?query-sendmail&apropos=0&sektion=0&manpath=FreeBSD+4.0-RE;EASE&format=html.

Ryan et al., "MobJeX: A Declaratively Configurable Java Based Framework for Resource Aware Object Mobility", 'Online', URL://www.cs.rmit.edu.au/eCDS/publications/DOAposterPaper.pdf.

Soininen et al., "Developing a Declarative Rule Language for Applications in Product Configuration", 'Online', URL:http//www.springerlink.com/media/87EXYKWHVN5J46LX8UE3/Contributions/V/J/F/U/VJFU2GLVLCNUMOMF.pdf.

* cited by examiner

RESOURCE MANAGEMENT WITH RULE BASED CONSISTENCY CHECK

This application is a continuation of application Ser. No. 10/639,865, filed Aug. 13, 2003 now U.S. Pat. No. 7,340,513.

TECHNICAL FIELD

The present invention relates to the data processing field, and more specifically to a resource management method and corresponding system.

BACKGROUND ART

Management of different types of resources (such as software components, applications or monitoring activities) is a critical issue in a data processing system with a distributed architecture; this problem is particular acute for resources that have a high level of complexity or are dispersed across a large number of installations. A typical example of a resource management environment is a software distribution application, which is used to upgrade software products installed on a network of workstations.

The resource management environments known in that art are based on an enforcement model (also known as manager/workers model). In this model, the resource management process is entirely controlled by an authority residing at a central site of the system. The authority defines the desired target state of every resource, which is directly controlled by a corresponding subject distributed in the system. The authority accesses a central repository storing the (assumed) current state for each pair resource/subject, and determines the management actions required to bring the resource to the target state. The management actions are then enforced remotely from the authority on the subject (which is totally passive).

For example, in the software distribution application cited above the authority defines packages including instructions specifying the actions to be carried out on the workstations for installing or removing selected software products. The package is transmitted to the workstations, and the corresponding instructions are interpreted so as to enforce the desired software configuration.

A drawback of the resource management environments known in the art is the lack of any kind of cooperation between the authority and the subjects. This lack of cooperation may bring about inconsistencies when the subjects change their configuration out of the control of the authority. For example, in the software distribution application the instructions of the package are typically conditioned to a series of hardware parameters of the workstation; in this case, a hardware upgrade of the target workstation may change the result of the evaluation of the conditions defined in the package, thereby making the software products installed on the workstation not consistent with its hardware configuration any longer. This lack of cooperation is unacceptable in high dynamic environments, wherein the configuration of the subjects changes frequently.

Moreover, all the proposed solutions require the authority to maintain information about the location of all the subjects; at the same time, the authority must handle the communication with every subject directly. This drawback is exacerbated in systems having a very high number of subjects, especially when they can change their spatial location freely.

One further problem may arise when the subjects are not available or are off-line. As a matter of fact, the lack of autonomy on the part of the subject requires that each management action must be completed within a pre-set deadline (with the need of fault tolerance, retry, check-point and restart mechanisms). As a consequence, the complexity of the resource management environment is strongly increased.

Additional complexity is added by the need of implementing different dependency schemes amongst the resources to be installed on every subject. This requirement involves the definition of a workflow implying some sort of conditioning or sequencing in the configuration of the resources. For example, in the software distribution application the installation of a product is a pre-requisite for the installation of a corresponding patch; as a consequence, the package to the distributed to the subjects must include quite complex instructions (in order to ensure the correctness of the resulting configuration).

SUMMARY OF THE INVENTION

It is an object of the present invention to provide a resource management method that implements an adaptive model.

It is another object of the present invention to support different dependency schemes in a very simple manner.

It is yet another object of the present invention to avoid an explicit definition of instructions implementing the dependency schemes.

The accomplishment of these and other related objects is achieved, in a data processing structure with a distributed architecture including a plurality of subject entities and at last one authority entity, by a resource management method for consistently self-configuring the subject entities, each subject entity controlling an instance of at least one resource and belonging to at least one of a plurality of logic categories and to at least one of a plurality of physic categories, the at least one authority entity defining a target state of the resources, wherein the method includes the steps of: publishing a plurality of rules by the at least one authority entity, at least one of the rules including an indication of the target state of a resource for a logic category of the subject entities and at least a further one of the rules including an indication of the target state of a resource for a physic category of the subject entities, and for each subject entity: retrieving the rules corresponding to the at least one logic category of the subject entity, applying each retrieved rule to configure the subject entity according to the target state thereby updating the at least one physic category of the subject entity, retrieving the rules corresponding to the at least one physic category of the subject entity, and applying each retrieved rule to configure the subject entity according to the target state.

The present invention also provides a computer program application for performing the method, a program product storing the application, and a computer program running on the subject entity.

The present invention also provides a resource management system implementing the method and a computer of the subject entity.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1A:
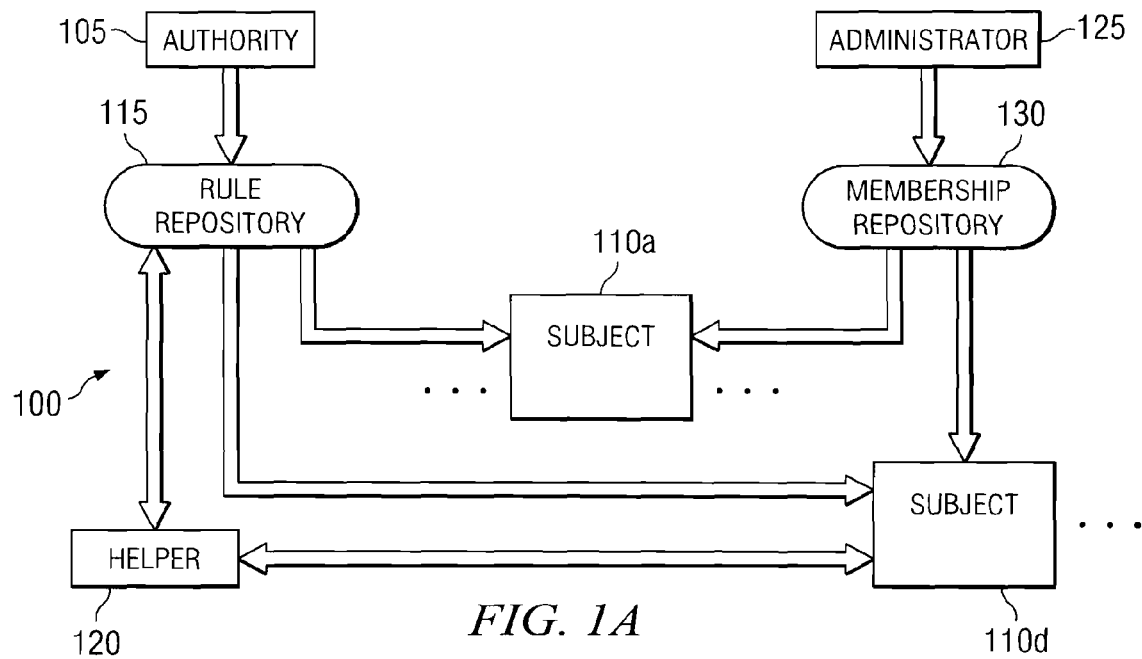
FIG. 1*a* is a schematic block diagram of a data processing system in which the resource management method of the invention is applicable.

With reference in particular to FIG. 1a, a data processing system 100 with a distributed architecture (typically INTERNET-based) is shown. The system 100 implements an environment for managing several kinds of resources, such as products in a software distribution application, activities in a monitoring application, and the like.

A computer 105 operates as an authority, which is responsible to define a desired configuration of the resource management environment. Multiple computers 110a,110d operate as heterogeneous subjects, which directly control (an instance of) one or more resources to be managed. Each subject 110a,110d consists of a logic and/or physic entity (such as a laptop, a Personal Digital Assistant (PDA), a SIM card of a mobile telephone, every user of a workstation, and the like).

The authority 105 and the subjects 110a,110d are coupled through a shared repository 115. The repository 115 stores a set of rules; each rule establishes the desired target state of a resource for a corresponding category of the subjects, defined according to their logic and/or physic characteristics. The rule repository 115 is implemented as a distributed shared memory (DSM), which provides a communication model giving the illusion of a shared memory on top of a message passing system. Preferably, the rule repository 115 consists of a tuple space (which is distributed on one or more computers); the tuple space includes a collection of fundamental data structures called tuples (each one representing a rule); the tuples are retrieved associatively (that is, according to their content rather than their address). The tuple space implements a cooperation model adhering to the peer-to-peer paradigm, wherein no role separation exists among the entities engaging the tuple space.

Some of the subjects (denoted with 110a) are completely autonomous, and access the rule repository 115 directly. Different subjects (denoted with 110d) depend on one or more subjects 120, which operate as helpers for the dependent subjects 110d; each helper 120 bridges between the rule repository 115 and the associated dependent subjects 110d (in order to retrieve the rules for the associated subjects 110d and then enforce their application). The helpers 120 and the dependent subjects 110d are coupled through the rule repository 115. Particularly, every subject 110d that is not completely autonomous inserts a rule identifying itself into the repository 115; a helper 120 retrieving this rule from the repository 115 is then automatically associated with the corresponding subject 110d.

A computer 125 operates as an administrator, which is responsible to define the membership of the subjects 100a, 110d dynamically. The administrator 125 and the subjects 110a,110d are coupled through a further shared repository 130 (preferably implemented as a tuple space); the repository 130 stores membership data for the subjects 110a,110d.

Figure 1B:
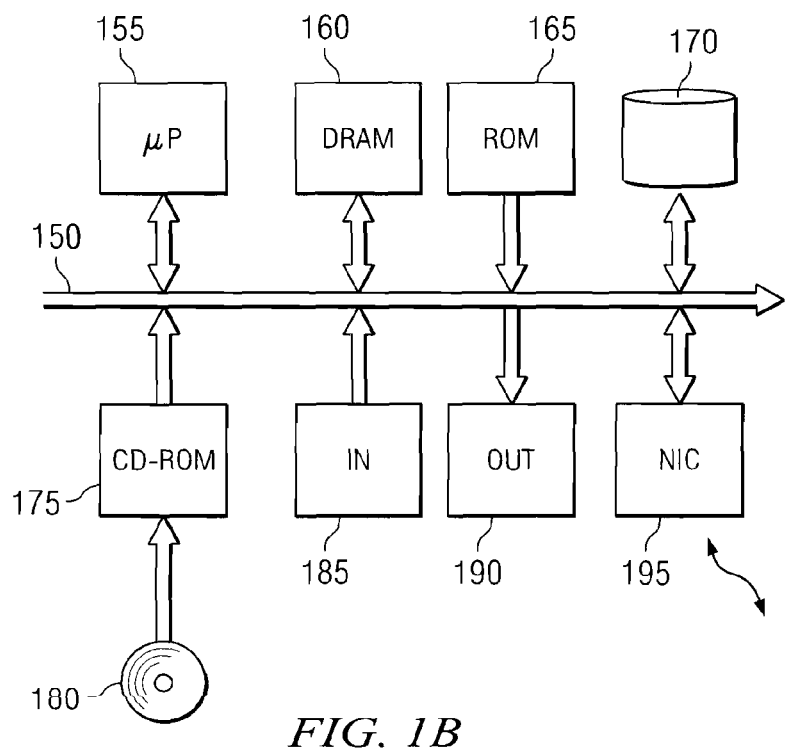
FIG. 1b shows the functional blocks of a generic computer of the system.

A shown in FIG. 1b, a generic computer of the system (authority, subject, helper and administrator) is formed by several units that are connected in parallel to a communication bus 150. In detail, a microprocessor (μP) 155 controls operation of the computer, a DRAM 160 is directly used as a working memory by the microprocessor 155, and a Read Only Memory (ROM) 165 stores basic code for a bootstrap of the computer. Several peripheral units are further connected to the bus 150 (by means of respective interfaces). Particularly, a mass memory consists of a magnetic hard-disk 170 and a driver 175 for reading CD-ROMs 180. Moreover, the computer includes input devices 185 (for example, a keyboard and a mouse), and output devices 190 (for example, a monitor and a printer). A network Interface Card (NIC) 195 is used to connect the computer in the system.

Similar considerations apply if the resource management system has a different distributed architecture (for example, based on a LAN), if the computers are connected to each other in a different way, if two or more authorities and/or administrators are provided, if the authority and the administrator consist of a single entity, if different subjects are envisaged, if the shared repositories are implemented with a different technology (even of a non-associative type, such as with relational databases), if the dependent subjects and the helpers are associated in another way, if the computers have a different structure or include other units, and the like.

Figure 2:
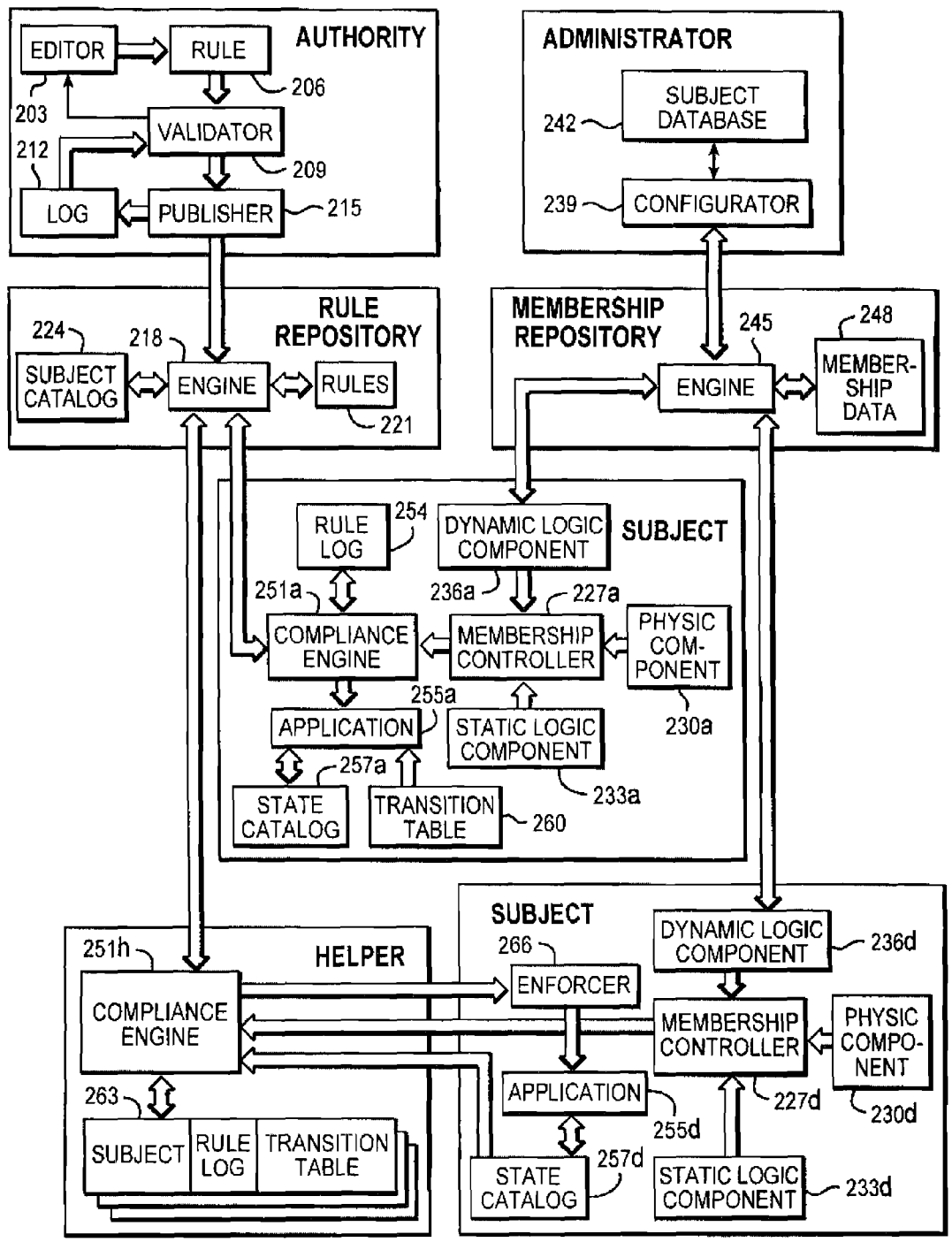
FIG. 2 depicts the main software components used for implementing the resource management method.

Considering now FIG. 2, the main software components used in the resource management system described above are illustrated. The information (programs and data) is typically stored on the respective hard-disks and loaded (at least partially) into the working memories when the programs are running, together with an operating system and other application programs (not shown in the figure). The programs are initially installed onto the hard-disks from CD-ROMs.

Particularly, the authority includes an editor 203 that is used to define new rules 206. Each new rule 206 is supplied to a module 209, which validates its correctness; for this purpose, the module 209 accesses a log 212 storing all the rules currently in force. When the new rule is in contrast with other rules, the editor 203 is notified accordingly. On the contrary, the new rule is supplied to a publisher 215; the new rule is then stored into the log 212 and provided to the corresponding repository.

The rule repository has an engine 218, which manages insertion of new rules into or deletion of pre-existing rules from its shared memory space 221; the engine 218 further controls extraction of a copy of the rules from the shared memory space 221, in response to corresponding requests from the subjects and the helpers. In addition, the subjects (either directly or through the associated helper) may register themselves with the engine 218 (in order to receive the respective rules as soon as they are available); information about pending requests still to be satisfied for these subjects is stored in a catalog 224.

Each autonomous subject includes a membership controller 227a, which assigns the subject to the category defined by its physic and/or logic characteristics. For this purpose, the membership controller 227a cooperates with one or more plug-in components.

For example, a first component 230a assigns the subject to a category defined according to its physic properties. For example, the physic category is specified by hardware characteristics (such as a hard-disk size, a CPU model, or a working memory capacity) and/or software characteristics (such as installed applications, files or folders). For this purpose, the component 230a relies on a hardware inventory scanner, a software inventory scanner and an application scanner.

A different component 233a statically assigns the subject to a category defined according to its logic properties. For example, the static logic category specifies different groups of users (such as secretaries, managers, developers, and system engineers) or different types of entities (such as desktops, laptops, PDAs or mobile telephones); the static logic category of the subject is derived from an identification code that is input during a log-in procedure or is hardwired.

Another component 236a dynamically assigns the subject to a category defined according to further logic properties. For example, the dynamic logic category specifies different functional units, departments, network domains, and the like. The dynamic logic categories are set by a configuration module 239 of the administrator. The configuration module 239 controls a database 242, which stores the dynamic logic category associated with each subject of the system (denoted by a corresponding identifier, such as a Globally Unique Identifier or GUID). The configuration module 239 publishes corresponding membership data into the respective repository. The membership repository has an engine 245, which manages a shared memory space 248 (storing the membership data); the component 236a directly interfaces with the engine 245, in order to retrieve the dynamic logic category associated with its identifier.

The membership controller 227a supplies the category associated with the subject (physic component, static logic component and dynamic logic component) to a compliance engine 251a. The compliance engine 251a interfaces with the engine 218 (of the rule repository) to retrieve the rules associated with its category. The retrieved rules are stored into a log 254 and then applied to the subject.

For this purpose, the compliance engine 251a drives one or more applications 255a managing corresponding resources. Each application 255a controls a state catalog 257a; the catalog 257a includes a series of records each one specifying the current state of a corresponding resource under management. The application 255a further accesses a transition table 260; for each resource controlled by the subject and for each pair current state/target state, the transition table 260 stores an indication of one or more management actions required to bring the resource from the current state to the target state.

Likewise, each dependent subject includes a membership controller 227d, which cooperates with a physic component 230d, a static logic component 233d, and a dynamic logic component 236d; the subject further stores one or more applications 255d with their state catalogs 257d (an additional module, not shown in the figure, is used to insert the rule identifying the subject into the shared memory space 221 of the rule repository, in order to associate the subject with a helper). The membership controller 227d and the state catalog 257d supply the category of the subject and the current state of the resources under management to a compliance engine 251h running on the associated helper. The compliance engine 251h accesses an inventory 263; for each subject controlled by the helper, the inventory 263 stores the corresponding rule log and transition table (in addition to information identifying the subject). The compliance engine 251h controls a module 266 running on the dependent subject, which module 266 drives the applications 255d for enforcing the management actions required to bring each resource of the subject from the current state to the target state.

Similar considerations apply if the whole application (consisting of the programs on the different computers) and the corresponding data are structured in a different manner, if other modules or functions are provided, if the category is defined in a different manner, if each component of the category is based on other characteristics of the subject, if the physic and/or logic characteristics of the subjects are detected in another way, if no state catalog is provided (with the current state of each resource that is detected dynamically), if the subject inventory on the helper stores different information, and the like.

Figure 3:
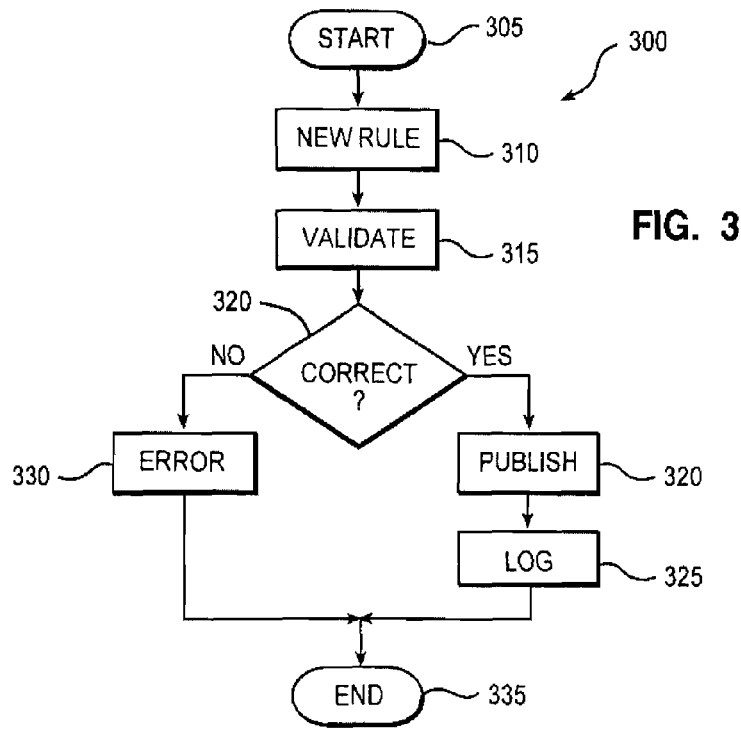
FIG. 3 is a flow chart describing the logic of the process of creating a new rule by the authority.

Considering now FIG. 3, a flow chart describing the logic of the process of creating a new rule by the authority is illustrated. The process implements a method 300 that starts at block 305. Proceeding to block 310, the new rule is defined specifying the target state of a resource for a corresponding category. The method validates the new rule at block 315; particularly, the method verifies that each subject cannot receive rules defining contrasting target states of the same resource. For this purpose, all the pre-existing rules relating to the same resource as the new rule are extracted from the log; for each extracted rule, if the target state of the new rule is different from the one of the pre-existing rule the method verifies that the associated categories are not overlapping.

Considering now block 320, if the new rule is correct the rule is published into the corresponding repository at block 320; the new rule is then logged at block 325. Conversely, an error condition is entered at block 330. In both cases, the method ends at the final block 335.

For example, let us consider a rule specifying that a resource APPLICATION must be in a state NON_INSTALLED on every subject of a (physic) category HARDDISK<10 Mbytes. A new rule is defined specifying that the same resource APPLICATION must be in a state INSTALLED on every subject of the (static logic) category SECRETARY. The new rule might cause an unstable situation; in fact, if a subject belongs both to the category HARDDISK<10 Mbytes and to the category SECRETARY, the applications of the two rules would result in a loop wherein the resource APPLICATION is continually installed by the new rule and removed by the pre-existing rule. In this case, the new rule should be amended to specify that the target state INSTALLED for the resource APPLICATION only applies to a category defined as SECRETARY AND NOT (HARDDISK<10 Mbytes).

Similar considerations apply if the pre-existing rules are not logged on the authority (but they are retrieved from the rule repository dynamically), if a different algorithm is used for validating the new rule, or if no validation is carried out before publishing the new rule (with the correctness of the rules that is verified by the subjects directly before their application).

On the other hand, each (autonomous) subject self-adapts to the respective rules published by the authority according to different policies.

In a first embodiment of the proposed resource management method, the subject operates in a pull mode. As shown in the activity diagram of FIGS. 4a-4b, a corresponding management process 400a begins at the black start circle 402 in the swim-lane of the subject. Descending into block 403, the subject retrieves the static logic component of its category. The process then enters a waiting loop at block 404. As soon as a pre-set time-out (for example, 1 minute) has expired, the subject determines the other current components of its category. Particularly the subject requests the dynamic logic component to the membership repository at block 405. In response thereto, the engine of the membership repository retrieves the corresponding membership data from its shared memory at block 406. The process continues to block 407, wherein this membership data is returned to the subject. Referring now to block 408 in the swim-lane of the subject, the returned membership data defines the dynamic logic component of the category of the subject. Hardware and software scans are then executed on the subject at block 410 (assuming that the rules for installing the corresponding components have already been applied), in order to detect the corresponding physic component of its category; the same activity is performed in response to the notification of a software and/or hardware upgrade carried out on the subject.

The rules associated with the category of the subject are requested to the corresponding repository at block 412. In response thereto, the engine of the rule repository enters the branch block 414. If no rule for the category of the subject is available the process returns to block 404 directly, in order to repeat the operations described above. Conversely, the process continues to block 416 wherein a copy of these rules is returned to the subject. Referring back to the swim-lane of the subject, the returned rules are logged at block 418.

The process continues to block 420, wherein the rules still to be applied on the subject are extracted from the respective log. The subject then applies each extracted rule directly. At first, the process verifies at block 422 whether the resource specified in the rule is in an inconsistent condition. If so, the corresponding entry of the state catalog is updated accordingly at block 424; the process then continues to block 426. Conversely, the process descends into block 426 directly. Considering now block 426, the current state of the resource is detected. The process then branches at block 428. If the resource is already in the target state defined in the rule, no action is required and the process returns to block 404. On the contrary, the process continues to block 430 wherein the actions required to bring the resource to the target state from the current state are extracted from the transition table. The actions are executed on the subject at block 432; if the execution of the actions is successful, the rule is flagged accordingly in the respective log. In any case, the process then returns to block 404.

Figure 4D:
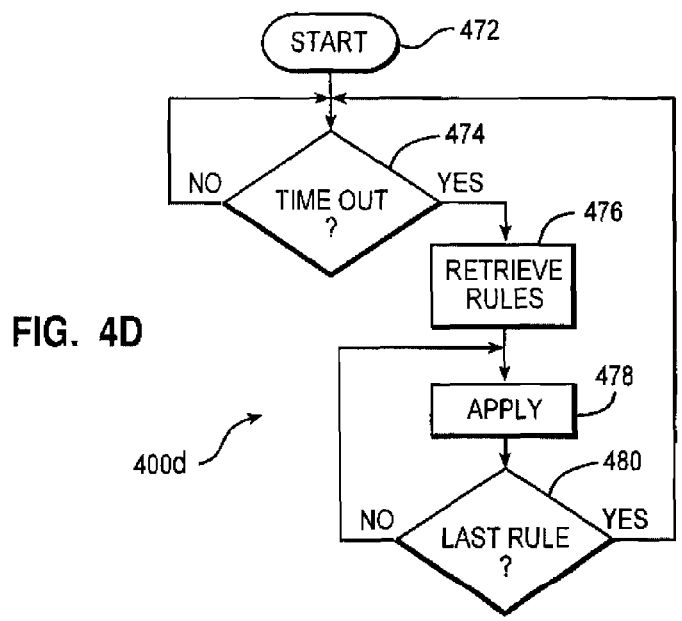
FIGS. 4a-4d are activity diagrams describing the flow of different processes executed by a subject of the system.
Figure 4A:
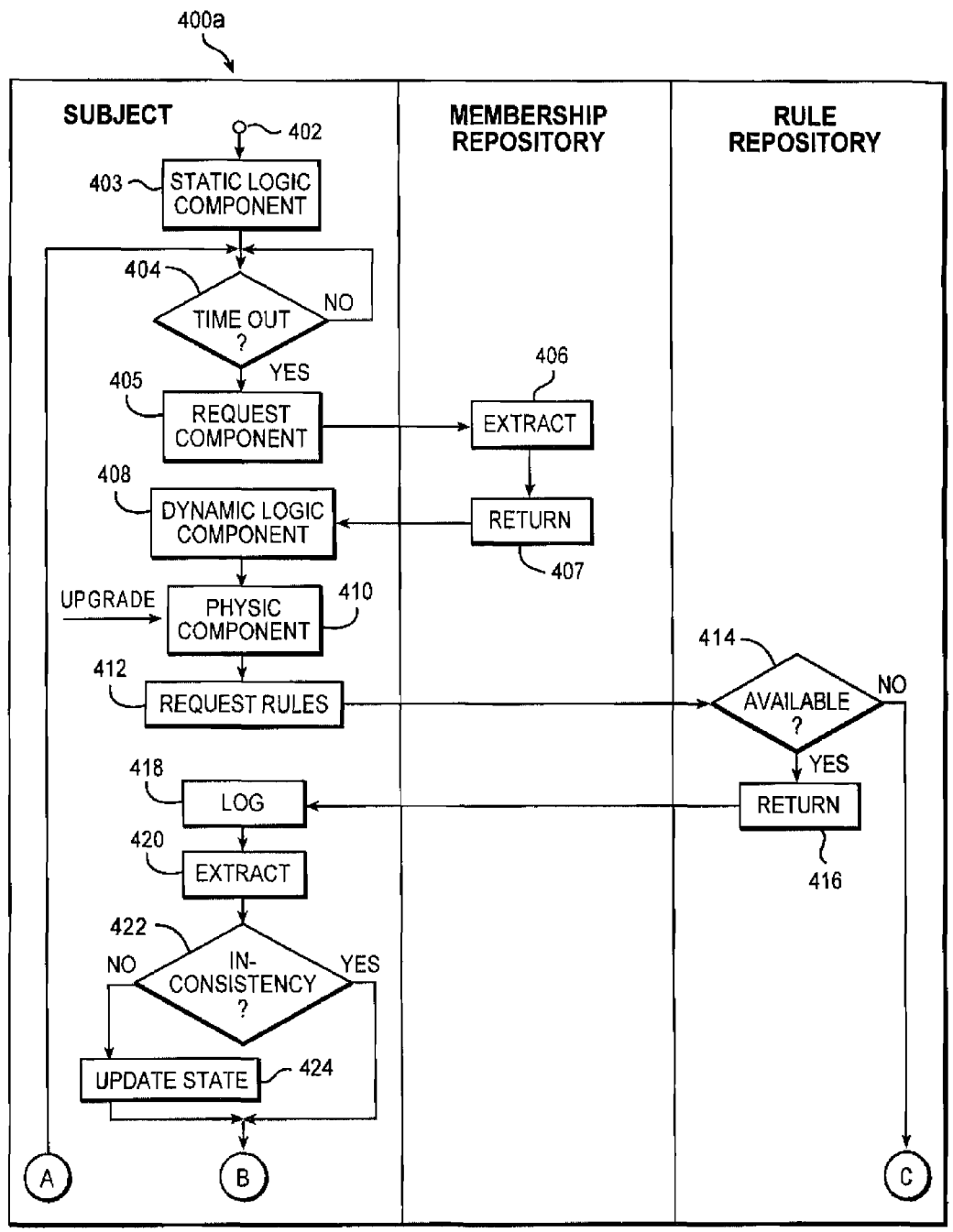
Figure 4B:
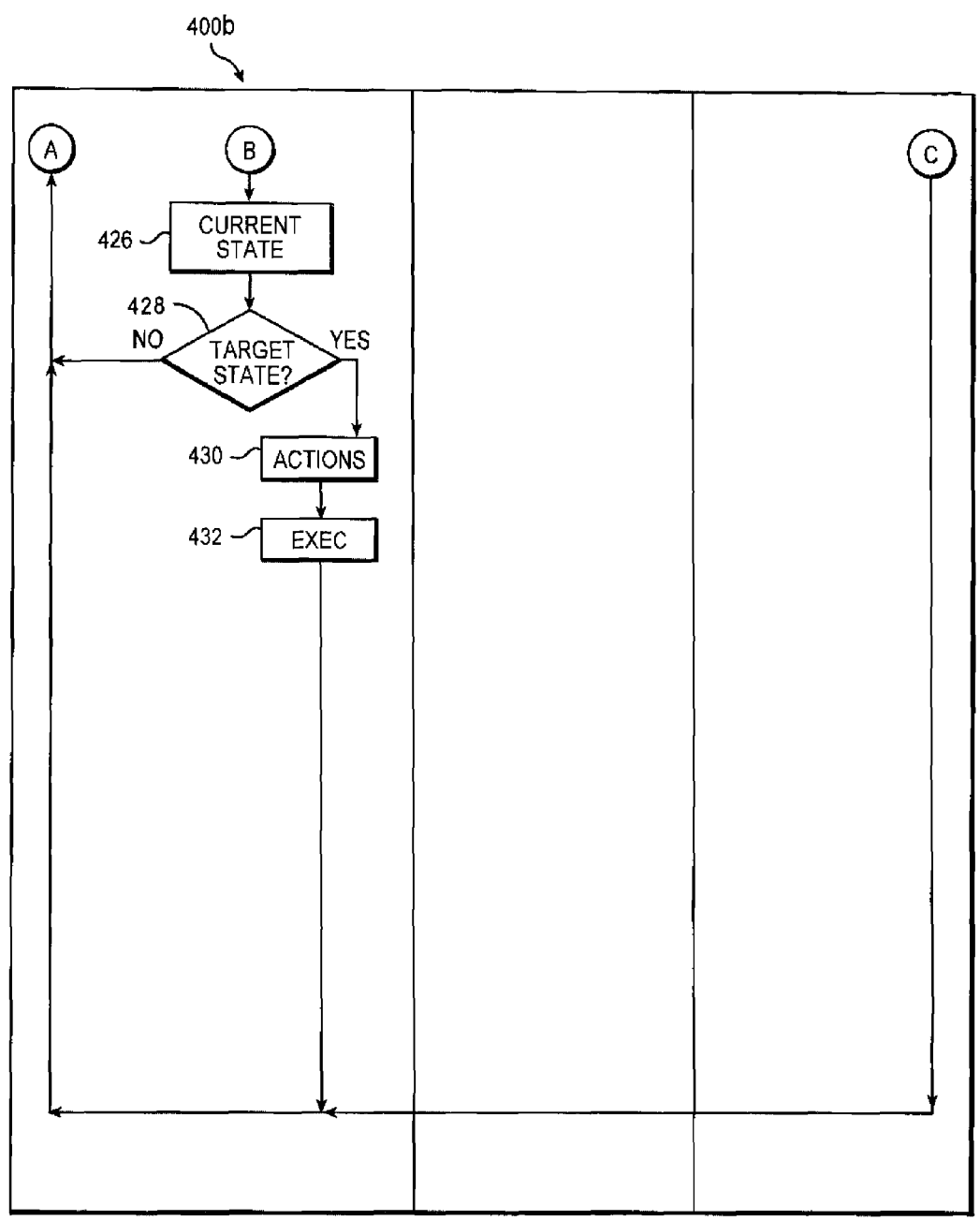
Figure 4C:
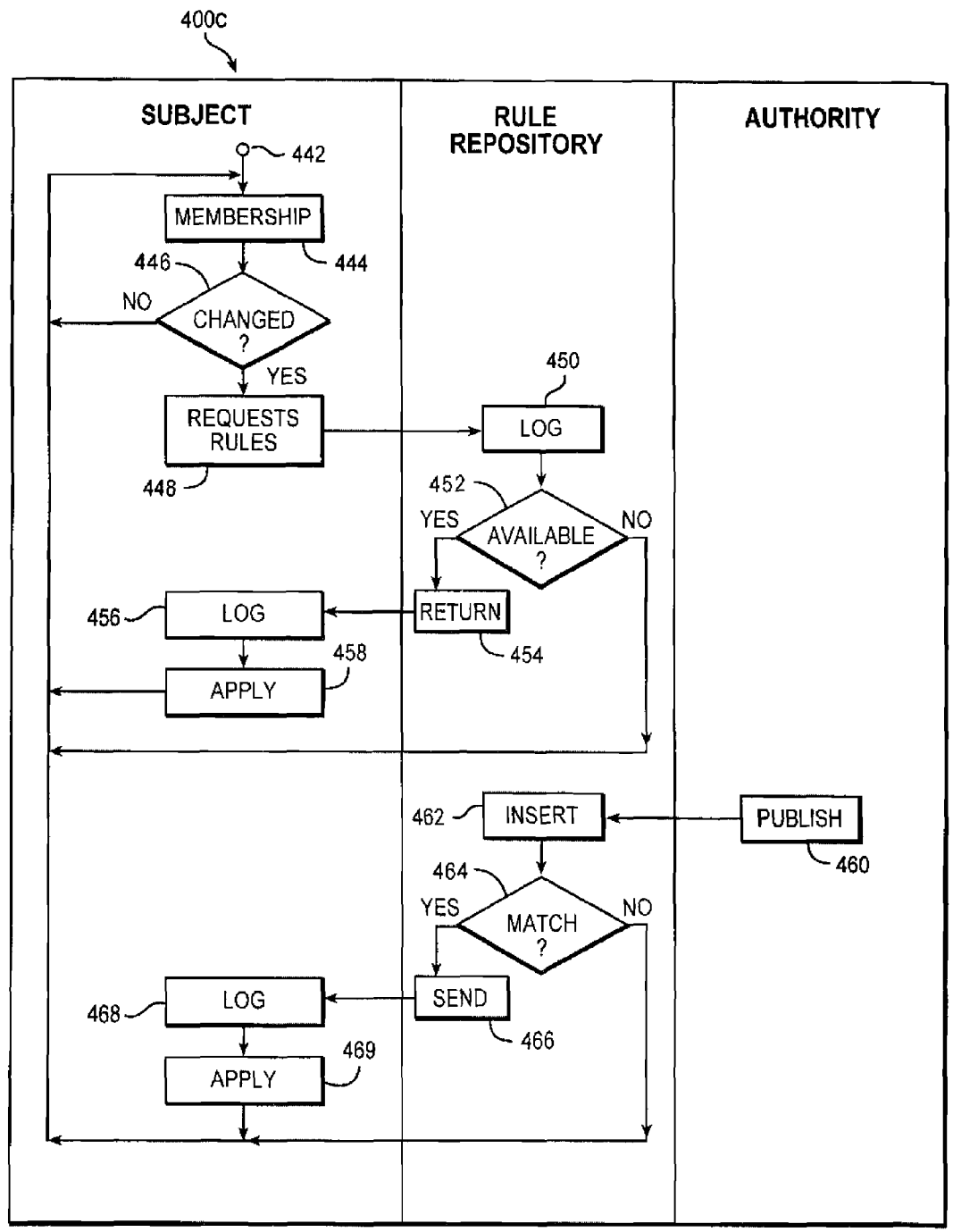

Alternatively, as shown in FIG. 4c, the subject operates in a reactive mode. At first, the subject implements a policy for updating the rules applied to the subject whenever its category changes. The policy consists of a set of activities beginning at the black start circle 442 in the swim-lane of the subject. Proceeding to block 444, the current category (static logic component, dynamic logic component and physic component) of the subject is detected as described above (with reference to blocks 403 and 405-410 of FIG. 4a). A test is made at decision block 446 to determine whether the category of the subject has changed since a last verification. If not, the process returns to block 444, in order to repeat the operations described above.

Conversely, the rules associated with the new category of the subject are requested to the rule repository at block 448. In response thereto, the engine of the rule repository logs the request at block 450. Moving to block 452, the activities on the rule repository branch into two mutually exclusive transitions. If no rule for the category of the subject is available, the process returns to block 444 directly. On the contrary, a copy of these rules is returned to the subject at block 454. The returned rules are logged on the subject at block 456. Proceeding to block 458, each rule is applied by the subject repeating the operations described above (with reference to blocks 420-432 of FIGS. 4a-4b). The process then returns to block 444.

The actual flow of activities implementing a management process 400c in the reactive mode starts at block 460 in the swim-lane of the authority, wherein one or more new rules are published. In response thereto, the rule repository inserts the new rules into its shared memory space at block 462. A test is made at decision block 464 to determine whether one or more of the new rules match the requests logged in the rule repository. If no matching rule is found, the process returns to block 444. Conversely, a copy of the matching rules is sent to the subject at block 466. The subject logs these rules at block 468; each rule is then applied by the subject at block 469. At the end, the process returns to block 444.

In addition to the pulling mode or to the reactive mode described above (or to both of them), the subject may also implement a healing mode of operation. As shown in FIG. 4d, a corresponding method 400d starts at block 472 and then enters a waiting loop at block 474. As soon as a pre-set time-out (for example, 1 hour) has expired, the process descends into block 476 wherein all the rules previously applied to the subject are retrieved from the corresponding log.

Each retrieved rule (starting from the first one) is applied again at block 478. In this way, the resource associated with the rule is first verified, in order to determine whether it is in an inconsistent condition; if so, the corresponding entry of the state catalog is updated accordingly. Therefore, when the current state of the resource is detected no action is carried out if the resource is correctly in the target state specified in the rule. Conversely, whenever the resource features any inconsistency it is restored to the correct target state by executing the corresponding management actions extracted from the transition table.

Considering now block 480, the method verifies whether the last rule has been processed. If not, the method returns to block 478, in order to apply again a next rule. Conversely, the method returns to the waiting block 474.

For example, let us consider a rule specifying that the resource APPLICATION must be in the state INSTALLED for the category of the subject. When the rule is first applied, the resource APPLICATION is brought to the target state INSTALLED. We now assume that the resource APPLICATION is brought to an inconsistent condition; for example, a component of the application (such as a file) is removed by mistake or during installation of another application. In this case, the verification of the rule detects the inconstancy and sets the state of the resource to INSTALLED_IN_ERROR. As a consequence, the rule is applied again performing the actions required to bring the resource APPLICATION from the state INSTALLED_IN_ERROR to the state INSTALLED.

Moreover, it should be noted that the proposed components defining the category of the subject remove the need to specify any information relating to a possible workflow implying some sort of conditioning or sequencing in the application of the rules; for example, this makes it possible to implement different dependency schemes (such as prerequisites, co-requisites and ex-requisites) without any explicit definition in the rules. For this purpose, it is enough to create rules that specify the target state of each resource for different (physic) categories defined according to the installation of the depending resources.

For example, let us consider a resource APPLICATION to be installed on the subjects of the (static) logic category SECRETARY; the resource APPLICATION requires the installation of a further resource PATCH as a co-requisite. For this purpose, the authority publishes a rule RULE1 for the logic category SECRETARY specifying that the resource APPLICATION must be in the state INSTALLED, and a rule RULE2 for the physic category APPLICATION=INSTALLED specifying that the resource PATCH must be in the state INSTALLED. A subject of the logic category SECRETARY retrieves and applies the corresponding rule RULE1, causing the resource APPLICATION to be installed. As a result, the same subject moves to the physic category APPLICATION=INSTALLED. Therefore, the rule RULE2 is retrieved and applied, causing the resource PATCH to be installed as well.

As a further example, let us consider a different resource PACKAGE to be installed on the subjects of the same logic category SECRETARY; the resource PACKAGE requires a resource LIBRARY as a pre-requisite. For this purpose, the authority publishes two rules for the logic category SECRETARY; a rule RULE3 specifies that the resource PACKAGE must be in the state INSTALLED, and a rule RULE4 specifies that the resource LIBRARY must be in the state INSTALLED. A subject of the logic category SECRETARY retrieves and applies both the rules RULE3 and RULE4 (in a random order). If the rule RULE3 is applied first, the execution of the required management actions aborts (since the pre-requisite resource LIBRARY is not installed yet) and the resource PACKAGE is not installed (so that the rule RULE3 will be applied again later on); on the other hand, the rule RULE4 is applied correctly. Therefore, the next application of the rule RULE3 is successful so as to bring the subject to the desired configuration.

Similar considerations apply if equivalent methods are envisaged (for example, with error routines that are called on the subject when the number of unsuccessful rules does not decrease at any application loop), if each subject operates both in the pulling mode and in the reactive mode, if the mode of operation of the subject is updated dynamically by corresponding rules, if other policies are envisaged for the subjects operating in the reactive mode, if each time-out has a different duration, and the like.

Figure 5A:
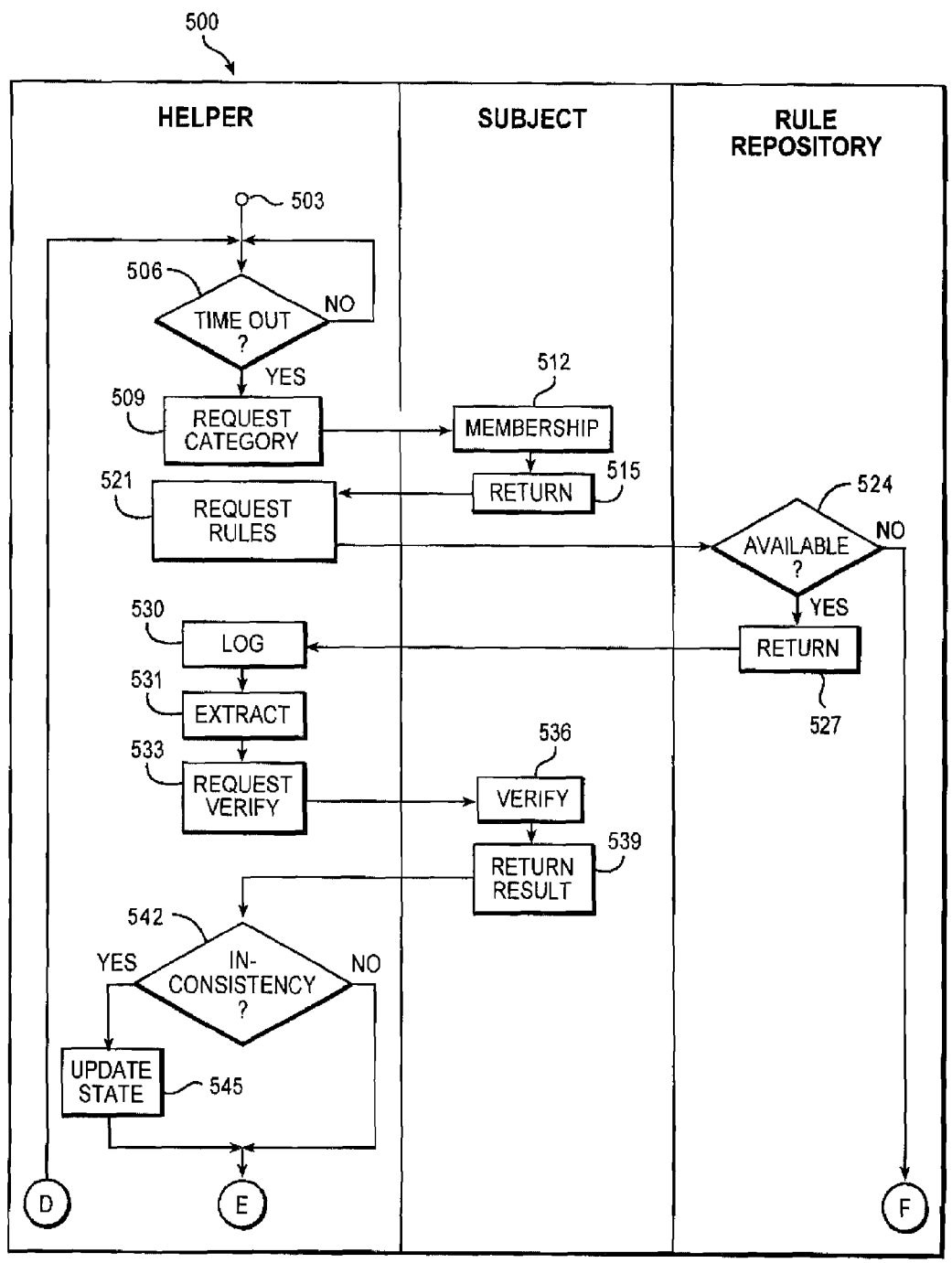
FIGS. 5a-5b is a further activity diagram relating to the operation of a helper of the system.
Figure 5B:
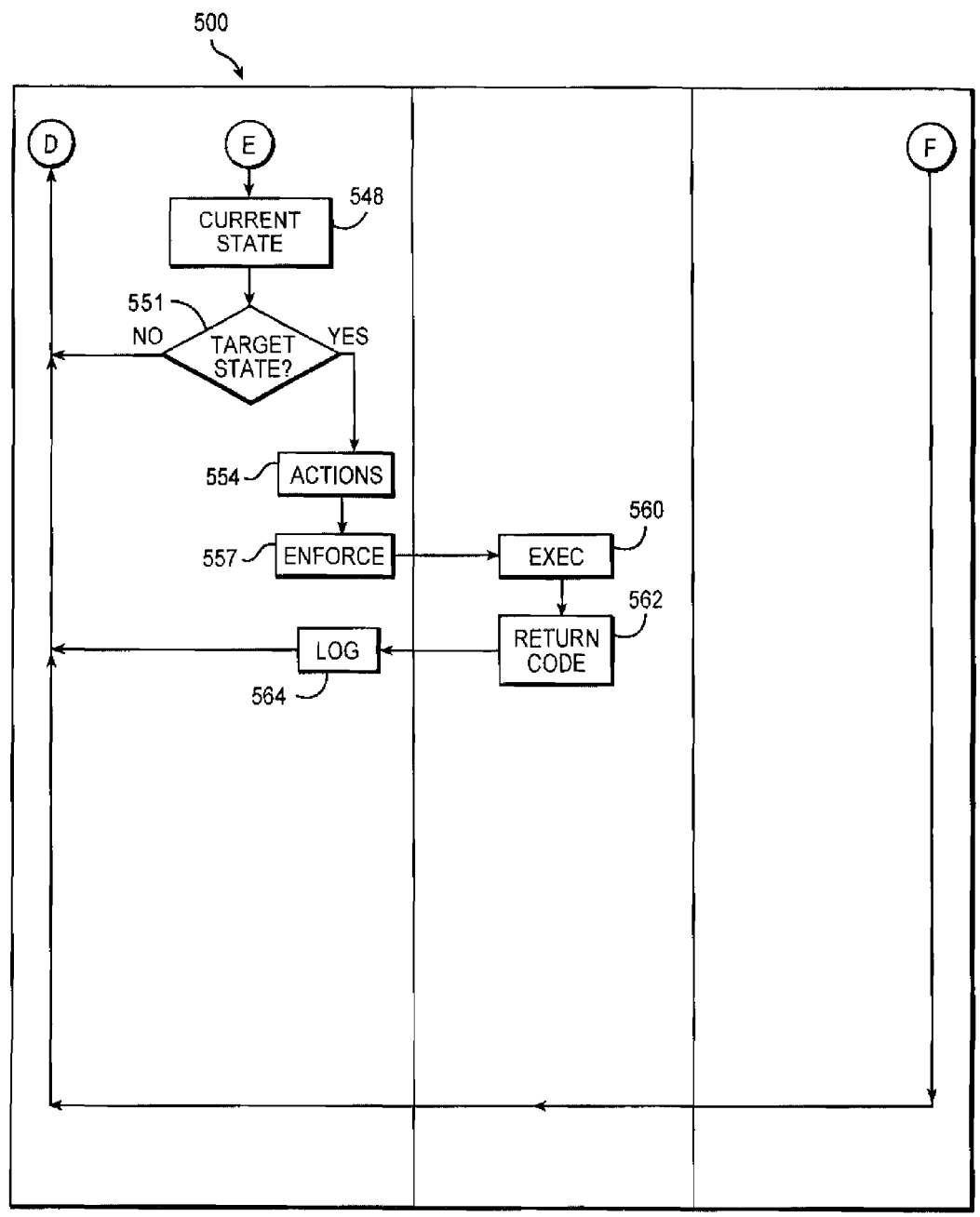

Considering now the helper, its operation in the pulling mode is illustrated by the activity diagram of FIGS. 5a-5b (similar considerations apply to the reactive mode and to the healing mode of operation). A corresponding resource management process 500 begins at the black start circle 503 in the swim-lane of the helper. The helper then enters a waiting loop at block 506. As soon as a pre-set time-out (for example, 1 minute) has expired, the process continues to block 509 wherein the helper inquires an associated dependent object for its category. In response thereto, the subject determines the current category at block 512. Proceeding to block 515, the current category is returned to the helper.

Referring back to the swim-lane of the helper, the rules associated with the category of the subject are requested to the rule repository at block 521. In response thereto, the engine of the rule repository enters the branch block 524. If no rule for the category of the subject is available the process returns to block 506 directly, in order to repeat the operations described above. Conversely, the process continues to block 527 wherein a copy of these rules is returned to the helper. Moving to block 530, the helper logs the returned rules into the corresponding entry of the subject inventory.

The process continues to block 531, wherein the rules still to be applied on the subject are extracted from the log of the subject inventory. Each extracted rule is then enforced on the subject by the helper. Particularly, at block 533 the helper requests the subject to verify the state of the resource associated with the rule. Proceeding to block 536, the subject performs the requested verification; the result of the verification is returned to the helper at block 539. Moving to decision block 542 in the swim-lane of the helper, if the returned result is indicative of any inconsistency the corresponding entry of the state catalog in the subject inventory is updated accordingly at block 545; the process then continues to block 548. Conversely, the process descends into block 548 directly. Considering now block 548, the current state of the resource is extracted from the state catalog in the subject inventory. The process then branches at block 551. If the resource is already in the target state defined in the rule, no action is required and the process returns to block 506. Conversely, the process continues to block 554 wherein the management actions required to bring the resource from the current state to the target state are extracted from the respective transition table of the subject inventory. Descending into block 557, the helper enforces the management actions on the subject. In response thereto, the subject at block 560 executes the management actions. The process passes to block 562, wherein a code indicative of the result of the management actions is returned to the helper. Considering now block 564 in the swim-lane of the helper, if the management actions have been successfully executed the rule is accordingly flagged in the log of the subject inventory. In any case, the process then returns to block 506.

Similar considerations apply if the helper controls more subjects, if each subject is associated dynamically with different helpers, if the helper and the subject interact in a different manner (for example, with the process that is started by the subject), if a different time-out is used, and the like.

Figure 6A:
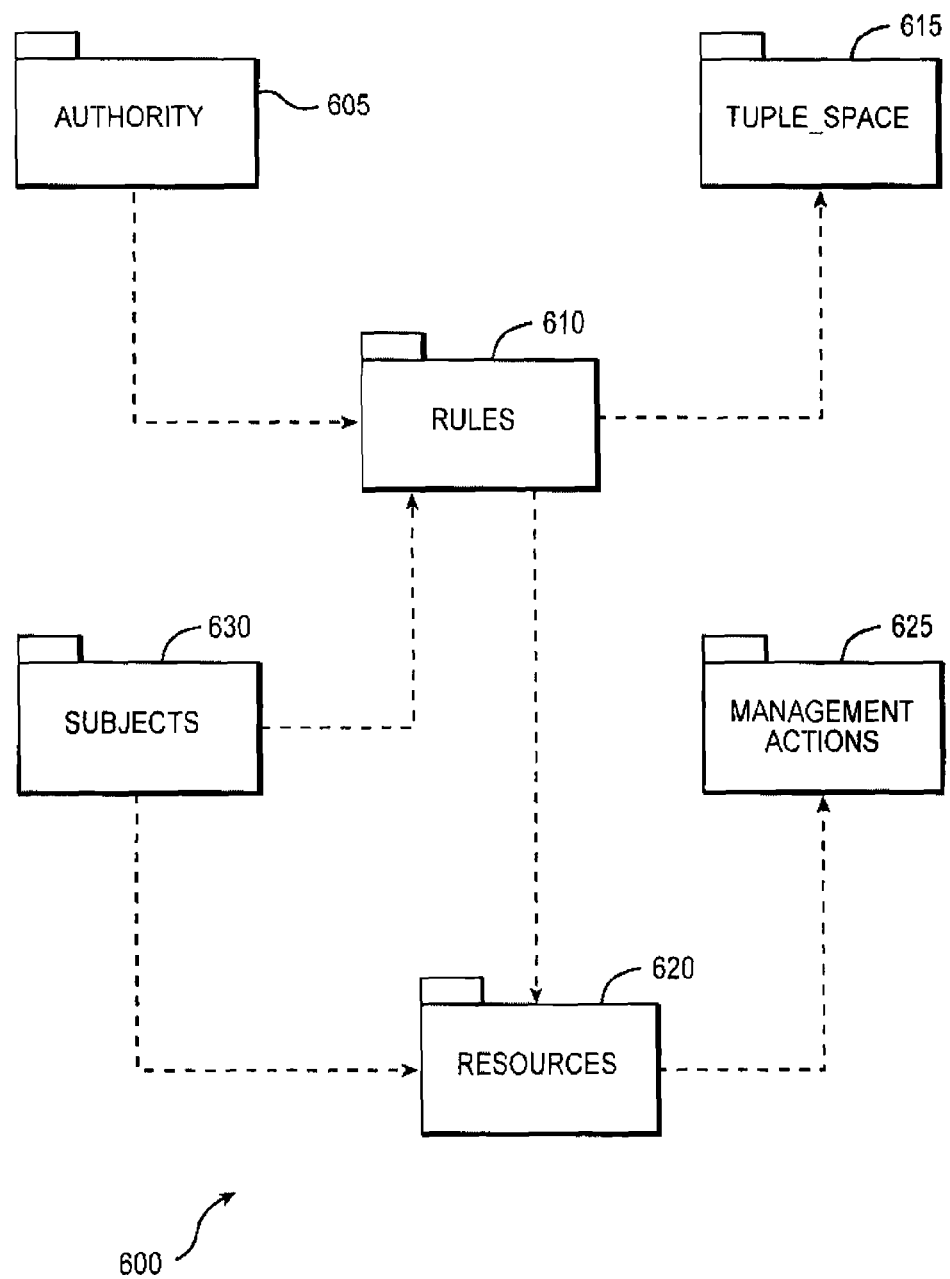
FIG. 6a shows a package diagram grouping the classes used to implement the method.

Referring now to FIG. 6a, the above-described resource management environment is preferably implemented with a software application 600 that is written in an object-oriented language (such as Java). The application 600 consists of a series of packages, each one grouping logically related classes. A package AUTHORITY 605 depends on a package RULES 610. The package RULES 610 knows a package TUPLE_SPACE 615 containing the specific tuples implementing the rules; the package RULES 610 also depends on a package RESOURCES 620. The package RESOURCES 620 knows a further package MANAGEMENT_ACTIONS 625. At the end, a package SUBJECTS 630 depends on the package RULES 610 (since every subject must know how to retrieve and apply the rules) and on the package RESOURCES 620 (for controlling the corresponding resources under management).

It should be noted that the package RESOURCES 620 and the package MANAGEMENT_ACTIONS 625 are completely unaware of the package RULES 610. In this way, the corresponding contexts are substantially independent; therefore, groups of persons with different roles and skills may be employed in the development of the application 600.

Figure 6B:
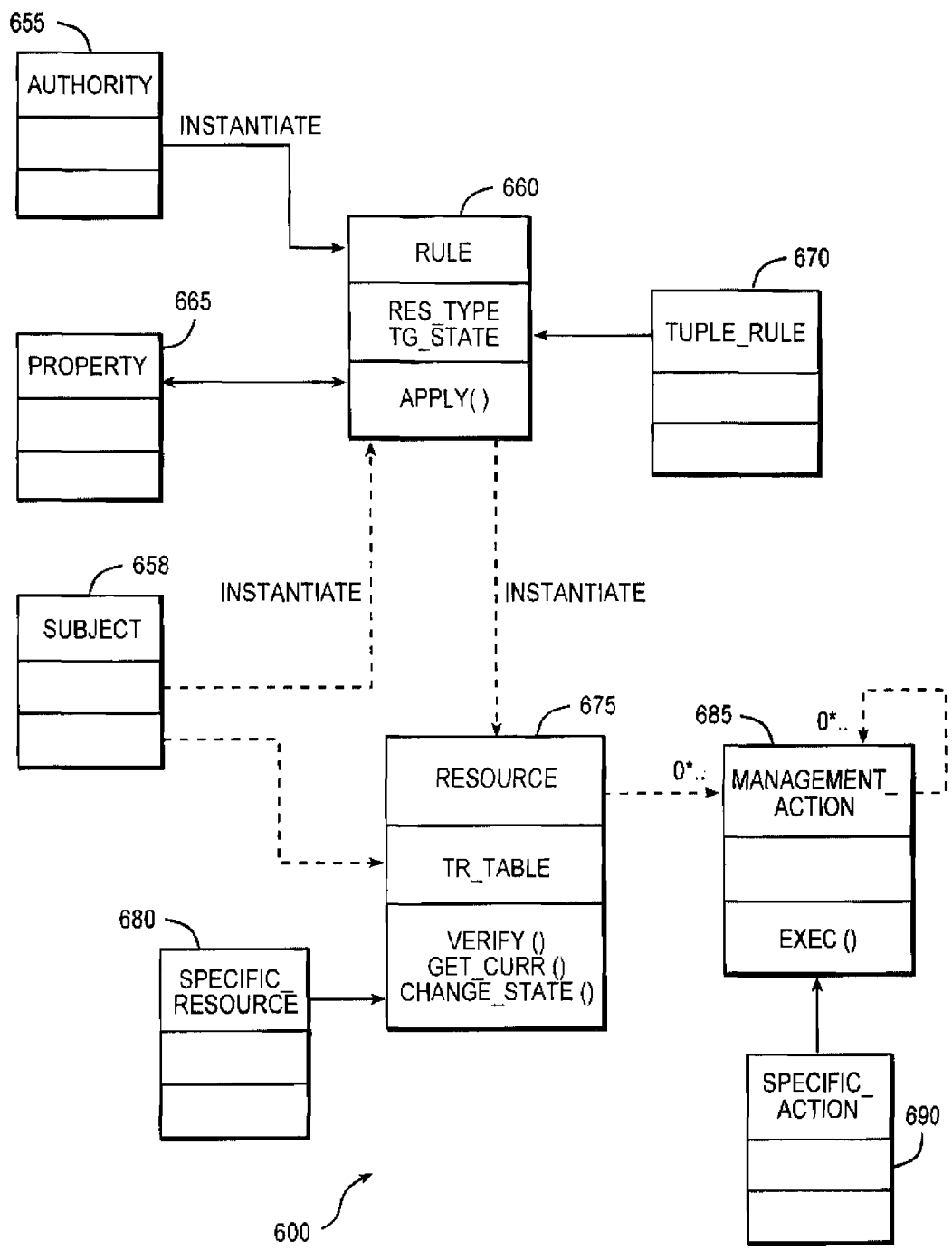
FIG. 6b depicts a corresponding class diagram.

The corresponding class diagram is shown in FIG. 6b. A class AUTHORITY 655 represents the authority of the system and a class SUBJECT 658 represents a generic subject. The class AUTHORITY 655 and the class SUBJECT 658 instantiate objects of a class RULE 660, which represents a generic rule of the resource management environment. The class RULE 660 has a private attribute RES_TYPE (specifying the class name of the corresponding resource) and a private attribute TG_STATE (specifying the target state of the resource); moreover, the class RULE 660 exposes a public method APPLY for implementing the corresponding rule on the subject.

The class RULE 660 has a collection consisting of any number of objects instantiating a class PROPERTY 665; each one of these objects includes additional information needed to apply the rule. A class TUPLE_RULE 670 extends the class RULE 660; the class TUPLE_RULE 670 defines a tuple, which represents an actual implementation of the corresponding rule in the tuple space.

The class RULE 660 and the class SUBJECT 658 instantiate objects implementing an interface RESOURCE 675, which represents a generic resource under management. The interface RESOURCE 675 declares an abstract attribute TR_TABLE for the corresponding transition table; moreover, the interface RESOURCE 675 exposes a public method VERIFY (for validating the state of the resource), a public method GET_CURR (returning the current state of the resource), and a public method CHANGE_STATE (for bringing the resource to the target state from the current state).

The interface RESOURCE 675 is implemented by concrete classes 680 (generically denoted with SPECIFIC_RESOURCE), each one corresponding to a different type of resource (such as a file, a directory, a software package, a monitoring activity, and so on). Each class SPECIFIC_RESOURCE 680 defines the content of the transition table in the attribute TR_TABLE.

The interface RESOURCE 675 is further associated with any number of objects implementing an interface MANAGEMENT_ACTION 685 (which in turn is recursively associated with itself). The interface MANAGEMENT_ACTION 685 exposes a public method EXEC (for performing the required operations on the subject).

The interface MANAGEMENT ACTION 685 is implemented by concrete classes 690 (generically denoted with SPECIFIC_ACTION), each one corresponding to a different type of management action (such as add, remove or change the attributes of a file/directory, install, remove or restore a software package, trigger or stop a monitoring activity, and so on). Each class SPECIFIC_ACTION 690 actually defines the method EXEC.

More specifically, each tuple is typically represented by a list of fields (up to 16) separated by commas and enclosed in parentheses; each field consists of a key/value pair. The tuple includes a first part (WHO part) that describes the corresponding category; particularly, a key GROUP defines a combination of physic components, static logic components and/or dynamic logic components. A second part of the tuple (WHAT part) describes the corresponding resource. In detail, a key RES_TYPE defines the class name of the resource and a key TG_STATE defines the target state of the resource. The tuple may include further key/value pairs defining additional information necessary to apply the rule; for instance, a key NAME identifies a particular instance of a software component (such as a file name), a key SOURCE identifies an address (such as an URL) from which the software component can be downloaded, a key DEST identifies the destination (such a folder) of the software component, and so on.

A tuple is added to the tuple space using a primitive OUT. For example, the following tuple:
    (GROUP:SECRETARY,RES_TYPE:APPLICATION, TG_STATE:INSTALLED) is inserted into the tuple space invoking the primitive:
    OUT(GROUP:SECRETARY,RES_TYPE:APPLICATION,
        TG_STATE:INSTALLED)
The tuples are read using either a non-blocking primitive RD or a blocking primitive IN. In both cases, actual parameters (consisting of values defining a search pattern) and formal parameters followed by a question mark (defining the requested fields) are passed to the tuple space. The formal parameters are used as wildcards to extract the tuples whose content matches the specified pattern (with the question mark alone that denotes all the fields). For example, the following primitive:
    RD(GROUP:SECRETARY,?)
will return the tuple described above.

The tuple space implements a peer-to-peer communication model, which totally decouples the authority from the subjects. Different levels of decoupling are supported. At first, a destination decoupling results from the fact that the authority and the subjects do not need to refer to each other explicitly (thereby providing a fully anonymous communication scheme). In other words, the authority and the subjects do not have any mutual knowledge of their location; conversely, it is the tuple space that identifies the receivers using logic boundaries implied by the information included in any request. Moreover, time decoupling results from the fact that the authority and the subjects do not need to be available at the same time. At the end, space decoupling results from the fact that the tuple is managed in the system with its actual location that is hidden to both the authority and the subjects.

The application of a generic rule involves the instantiation of an object of the type TUPLE_RULE (passing the corresponding tuple as a parameter), followed by the calling of the method APPLY. The method APPLY instantiates an object of the type SPECIFIC_RESOURCE (whose name is stored in the attribute RES_TYPE). This method in sequence calls the method VERIFY and the method GET_CURR on the object of the type SPECIFIC_RESOURCE; the method CHANGE_STATE is then called passing the current state (returned by the method GET_CURR) and the target state (stored in the attribute TG_STATE) as parameters. The method CHANGE_STATE queries the transition table (stored in the attribute TR_TABLE), in order to determine the required management actions. One or more objects of the corresponding type SPECIFIC_ACTION are instantiated, and the method EXEC is called on every one of them.

Figure 7:
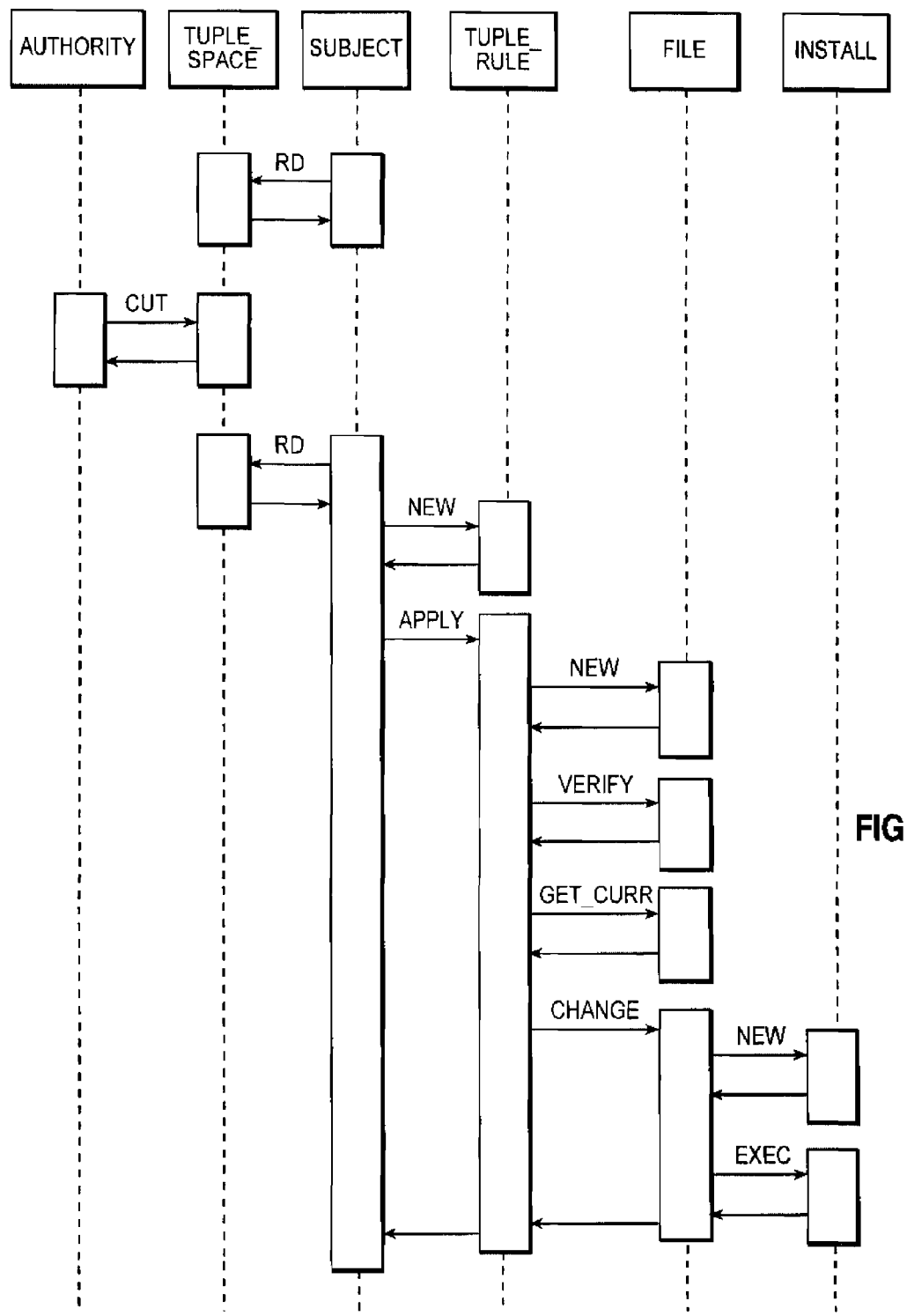
FIG. 7 is a sequence diagram exemplifying a resource management operation.

An example of application of a rule (on a subject operating in the pull mode) is illustrated in the sequence diagram of FIG. 7. An object SUBJECT starts the sequence of messages requesting the corresponding rules to an object TUPLE_SPACE. For this purpose, the object SUBJECT calls a method implementing the primitive RD (passing its category as a parameter). Assuming that the object SUBJECT belongs to the (static logic) category SECRETARY, the following primitive is called:
    RD(GROUP:SECRETARY,?)
The primitive RD is not blocking, so that if no rule matching the pattern is available (as in the example shown in the figure) the SUBJECT waits for a pre-set period of time before engaging the tuple space again.

An object AUTHORITY inserts a new rule into the tuple space calling a method implementing the primitive OUT. The rule consists of a tuple specifying that all the subjects of the (static logic) category SECRETARY must have a resource SW_DIST_RES in a target state INSTALLED; the name of a corresponding file (FILE_NAME), the address from which the file can be downloaded (FILE_ADDRESS) and the folder in which the file must be installed on the subject (FOLDER_NAME) are specified by corresponding key/value pairs:
    (GROUP:SECRETARY,RES_TYPE:SW_DIST_RES,
     TG_STATE:INSTALLED,NAME:FILE_NAME,
     SOURCE:FILE_ADDRESS,DEST:FOLDER_NAME)
Therefore, when the object SUBJECT queries again the object TUPLE_SPACE a tuple matching the corresponding pattern is available. The object SUBJECT then starts processing the received tuple, and instantiates an object TUPLE_RULE (passing the tuple as a parameter). The sequence of activities continues with the object SUBJECT that calls the method APPLY on the object TUPLE_RULE.

This method instantiates an object SW_DIST_RES (using the class name stored in the attribute RES_TYPE). The method VERIFY and the method GET_CURR are then called in sequence on the object SW_DIST_RES. The process continues with the calling of the method CHANGE_STATE (passing the current state returned by the method GET_CURR and the target state stored in the attribute TG_STATE as parameters). This method determines the required management actions by querying the transition table (stored in the attribute TR_TABLE).

For example, assuming that the file specified in the tuple is not installed on the subject (current state NON_INSTALLED), the transition table indicates that the management actions required to bring the file to the target state INSTALLED from the current state NON_INSTALLED are defined in a class INSTALL. Therefore, an object of the type INSTALL is instantiated; the method EXEC is then called on this object, so as to complete the application of the rule.

Similar considerations apply if the application is implemented in a different language (even non-object-oriented), if the rules have a different structure, if the classes are grouped in different packages, if other classes, interfaces, attributes and/or methods are envisaged, if a different sequence of activities is used to apply the rules, and the like.

The resource management environment described above implements an adaptive model, which can be compared to the behavior of the human society. For example, in the human society a central authority (such as the parliament) enacts a series of laws for the citizens. Each law has a general character, and defines different provisions for corresponding categories of the citizens. For example, financial laws specify a series of tax rates, each one to be applied for a corresponding income range. The parliament publishes the laws using an official bulletin. Every citizen has the responsibility to remain up to date with the laws. In this way, the citizen can calculate the taxes to be paid applying the rate corresponding to his/her income (without the need for the parliament to know the economic situation of every citizen).

Moreover, each citizen may entrust another person with the responsibility of applying the laws (according to his/her personal situation). For example, the citizen may decide to have a certified public accountant take care of all tasks relating to tax payment. In this case, the citizen simply notifies his/her income to the accountant; the accountant calculates the taxes applying the corresponding rate and then informs the citizen of the amount to be paid.

The proposed solution clearly distinguishes from the enforcement model implemented by the resource management environments known in the art. Referring again to the parallel with the civil society, a central authority (such as the gas company) collects information about the conditions of every user; the central authority then issues a series of measures, each one individually tailored to the condition of the corresponding user. For example, the gas company detects the consumption of every user through a meter reading, and then issues corresponding invoices (wherein the amount to be paid is calculated according to the consumption). The invoice is sent to the user, which has a pre-set period of time for paying the amount specified in the invoice.

In other words, the model described above provides an autonomic computing implementation of the resource management environment. The term autonomic comes from an analogy to the autonomic central nervous system in the human body, which adjusts to many situations automatically without any external help. Similarly, in the proposed resource management environment each subject is able to configure, tune and repair itself, as well as anticipate and solve performance problems automatically.

More generally, the present invention is implemented in a data processing structure with a distributed architecture. The structure includes multiple subject entities and one or more authority entities.

The invention proposes a resource management method for consistently self-configuring the subject entities. Each subject entity controls an instance of one or more resources; moreover, the subject entity belongs to one or more logic categories and to one or more physic categories. The authority entity defines a target state of the resources. The method starts with the step of publishing a plurality of rules by the authority entity; one or more of the rules includes an indication of the target state of a resource for a logic category of the subject entities and one or more of the rules includes an indication of the target state of a resource for a physic category of the subject entities. A series of further steps are carried out for each subject entity. Particularly, the rules corresponding to the logic category of the subject entity are retrieved. Each retrieved rule is then applied to configure the subject entity according to the target state; as a consequence, the physic category of the subject entity is updated. The rules corresponding to the physic category of the subject entity are now retrieved; each retrieved rule is then applied to configure the subject entity according to the target state.

The solution of the invention provides a resource management method that implements an adaptive model.

The logic and physic categories of the subjects make it possible to implement different dependency schemes in a very simple manner (at the information level instead of at the procedural level).

This result is achieved without any explicit definition of the dependency schemes in the rules.

The preferred embodiment of the invention described above offers further advantages.

Particularly, the rules are published in a shared memory space.

This structure provides a peer-to-peer communication model, which implements a complete decoupling of the authority from the subjects (destination decoupling, time decoupling and space decoupling). The shared memory space is particularly advantageous when the authority and the subjects are spatially dispersed in different locations (even if different applications are not excluded).

Advantageously, the logic category has a dynamic component, which is extracted from a further shared memory space.

In this way, an administrator may manage the dynamic logic category of each subject of the system centrally in a very simple manner (exploiting all the advantageous effects of the shared memory space described above).

In a particular embodiment of the invention, the physic category is detected performing a software and/or hardware scan.

The proposed method ensures that the collected information is always up-to-date.

A way to further improve the solution is to define the hardware and/or software characteristics to be detected by means of rules applying to a specific resource consisting of a scanner module.

The proposed feature makes it possible to coordinate operation of the scanner module with the rules defined by the authority in a very simple manner.

However, the solution according to the present invention leads itself to be implemented with the subjects that request the rules directly to the authority, or supporting a single logic component (either the static one or the dynamic one). Alternatively, the dynamic logic component is set in another way (such as in response to a message transmitted by the administrator to the subject), the physic component is detected in a different manner (for example, inquiring a configuration catalog), another method of changing the hardware and/or software characteristics to be detected is provided, or no possibility of changing these characteristics is supported.

Advantageously, the solution according to the present invention is implemented with a computer program application, which is provided on CD-ROM. The application consists of different software modules, which are installed on the computer of the authority, on the computer of every subject, and on the computer of the helper (if any). Moreover, it should be noted that each module is suitable to be implemented separately and put on the market even as a stand-alone product.

Alternatively, the application is provided on floppy-disks, is pre-loaded onto the hard-disks, or is stored on any other computer readable medium, is sent to the computers through a network (typically the INTERNET), is broadcast, or more generally is provided in any other form directly loadable into a working memory of the computers. However, the method according to the present invention leads itself to be carried out with an application having a different architecture, or even with a hardware structure (for example, integrated in a chip of semiconductor material).

Naturally, in order to satisfy local and specific requirements, a person skilled in the art may apply to the solution described above many modifications and alterations all of which, however, are included within the scope of protection of the invention as defined by the following claims.

The invention claimed is:

1. A computer program product comprising a non-transitory computer useable medium having a computer readable program stored thereon, wherein the computer readable program, when executed in a data processing system including a plurality of subject entities and at least one authority entity:
   performs a resource management method for consistently self-configuring a subject entity within the plurality of subject entities when the computer readable program is run on a computer of the subject entity, wherein each subject entity in the plurality of subject entities controls an instance of at least one resource and belongs to at least one logic category of a plurality of logic categories and to at least one physic category of a plurality of physic categories, the at least one authority entity defining a target state of the at least one resource by:
      publishing a plurality of rules, at least one rule of the plurality of rules including an indication of the target state of the at least one resource for the at least one logic category of each subject entity and at least a further rule of the plurality of rules including the indication of the target state of the resource for the at least one physic category of each subject entity, and
   for each subject entity:
      determining if a current state of the at least one resource on the subject entity corresponds to the target state;
      responsive to the current state failing to correspond to the target state, enforcing a management action to bring the current state of the at least one resource to the target state;
      responsive to the current state corresponding to the target state, retrieving a first set of rules from the plurality of rules corresponding to the at least one logic category of the subject entity;
      configuring each subject entity according to the target state by applying the first set of rules;
      retrieving a second set of rules corresponding to the at least one physic category of each subject entity; and
      configuring the subject entity according to the target state by applying the second set of rules.

2. The computer program product according to claim 1, wherein publishing the plurality of rules includes inserting the plurality of rules into a shared memory space accessible by the subject entities.

3. The computer program product according to claim 1, wherein each logic category includes a dynamic component, and for each subject entity detecting the dynamic component of the at least one logic category of the subject entity by retrieving the dynamic component associated with an identifier of the subject entity from a further shared memory space accessible by the subject entities.

4. The computer program product according to claim 1, further for each subject entity:
   detecting the at least one physic category of the subject entity by performing a scan of hardware or software characteristics of the subject entity.

5. The computer program product according to claim 4, wherein the at least one resource consists of a scanner module for detecting the hardware or software characteristics of the subject entity, and wherein at least one of the plurality of rules defines the hardware or software characteristics to be detected by the scanner module.

* * * * *